J. P. GARDNER.
WEATHER STRIP.
APPLICATION FILED OCT. 1, 1913.
1,093,394.
Patented Apr. 14, 1914.
2 SHEETS—SHEET 2.
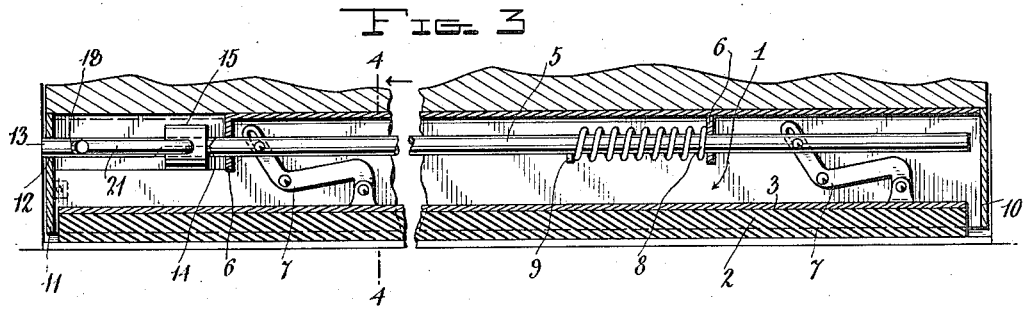
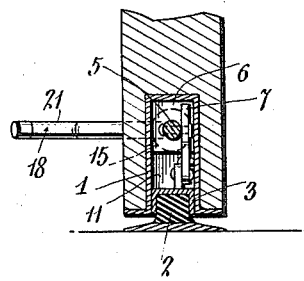
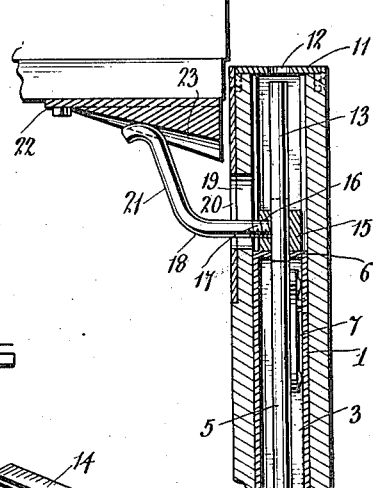
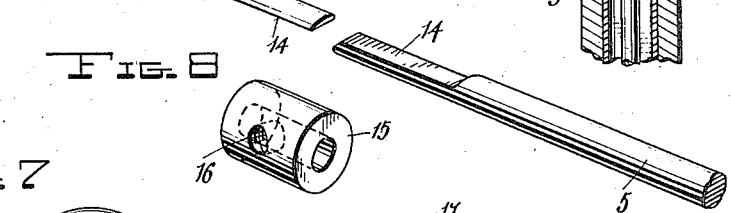
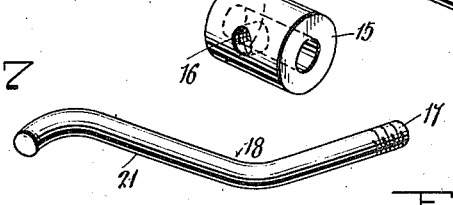
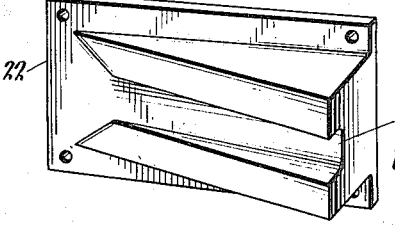
Witnesses
Inventor
John P. Gardner,
by
Attorney.

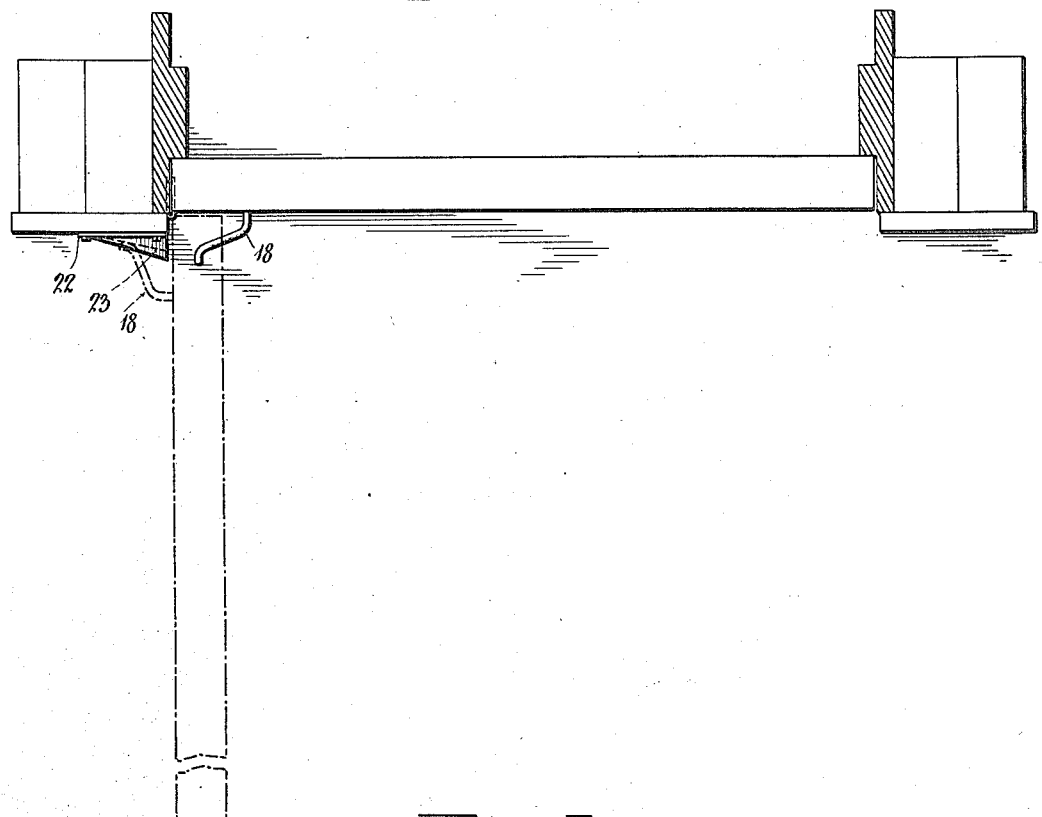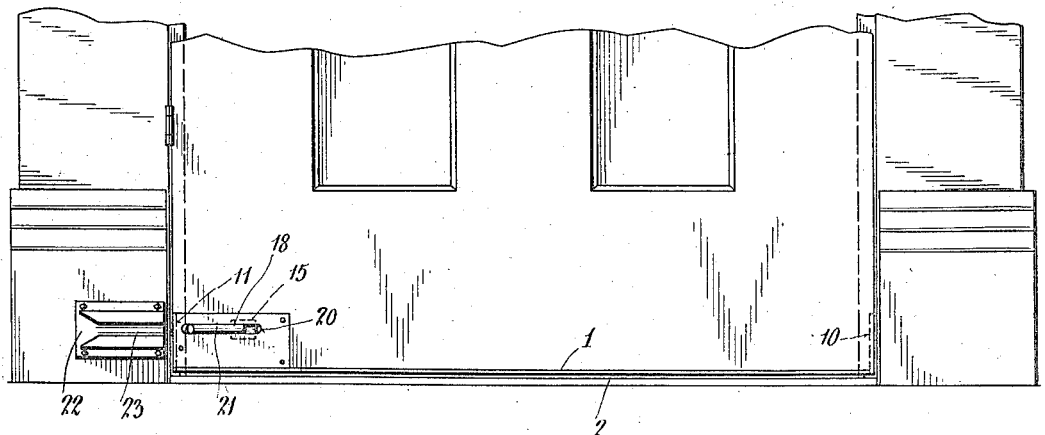

UNITED STATES PATENT OFFICE.

JOHN P. GARDNER, OF CAIRO, ILLINOIS.

WEATHER-STRIP.

1,093,394. Specification of Letters Patent. Patented Apr. 14, 1914.

Application filed October 1, 1913. Serial No. 792,823.

*To all whom it may concern:*

Be it known that I, JOHN P. GARDNER, a citizen of the United States, residing at Cairo, in the county of Alexander and State of Illinois, have invented new and useful Improvements in Weather-Strips, of which the following is a specification.

This invention relates to improvements in weather strips and more particularly to a construction of that type wherein the weather strip proper is fitted in a casing, set into the bottom of the door and is combined with certain elements whereby it may be projected to engage the floor or sill or retracted to disengage the floor or sill.

The present invention proposes certain novel features of construction involving the projecting and retracting operations of the weather strip and whereby the latter functions as a weather strip when the door is closed, and as a door holder when the door is fully opened, and also whereby a cushioning action is secured as the door comes into either its full open or closed position, and just prior to the engagement of the weather strip with the floor or sill.

An embodiment of the invention is illustrated in the accompanying drawings, wherein:—

Figures 1 and 2 are views in plan and elevation of a door to which the improvement is applied; Fig. 3 is a vertical longitudinal sectional view of the improved weather strip organization; Fig. 4 is a sectional view on the line 4—4 of Fig. 3; Fig. 5 is a horizontal sectional view showing the relation of the parts of the weather strip organization when the door reaches its open position; Fig. 6 is a detail perspective view illustrating certain features of construction of the slidable operating rod; Fig. 7 is a similar view showing a projecting arm by which the action of the rod shown in Fig. 6 is initiated when the door comes in open position; Fig. 8 is a similar view of a sleeve by which the parts shown in Figs. 6 and 7 are held in proper relation to one another; and Fig. 9 is a similar view of a grooved plate which is fitted on a door jamb and coöperates with the arm shown in Fig. 7.

Similar characters of reference designate corresponding parts throughout the several views.

The door has a bottom recess which extends approximately the full width thereof, as shown in Figs. 4 and 5, and in said recess there is fitted a casing 1 which has an approximately inverted U-shape in cross section, and which serves to confine and protect the weather strip proper, comprising a body 2 of rubber or other suitable weather proofing material and a channel 3 in which said body is fitted and which, together with the body 2, is movable vertically of the casing 1.

The weather strip is to be projected from or retracted into the casing 1 and the connections for achieving these operations preferably comprise a rod 5 which is slidable longitudinally of said casing and is supported in lugs 6 depending from the upper wall of said casing, and levers 7 which are pivoted between their ends to a side wall of the casing 1 and at their ends are pivoted to the rod 5 and to the channel 3 respectively, the pivotal connections of the levers 7 and the rod 5 consisting of the well known slot and pin joint. The retraction of the weather strip into the casing 1 is effected, preferably, by an expansive coil spring 8, the ends of which bear against one of the lugs 6 and against a lug 9 on the rod 5.

The ends of the recesses in which the casing 1 is fitted are closed by plates 10 and 11, and the plate 11 is provided with an opening 12 through which works a rod 13 complemental to the rod 5 and, in effect, forming an axial extension or continuation of the latter. When the weather strip is in retracted relation, the rod 13 is projected through the opening 12 and as the door comes into closed position, the end of said rod engages the adjacent door jamb, such engagement manifestly being effective to move the rod 5 against the tension of the spring 8 and to thereby project the weather strip from the casing 1, as shown in Figs. 3 and 4.

The rods 13 and 5 preferably have their adjacent ends flattened, as at 14, (Fig. 6) and said rods are held in relation to one another by a sleeve 15 which surrounds the overlapping flattened portions 14. The sleeve 15 has a threaded aperture 16 in which there engages the threaded end 17 of an arm 18, the said threaded end 17 being utilized to positively hold the ends of the rods 13 and 5 within the sleeve 15. The arm 18 projects laterally through a recess 19 in the end of the casing 1 adjoining the plate 12, and through a slot 20 in the door and which alines with the recess 19. The outer end portion of the arm 18 is turned inwardly to a position nearly parallel with the adjacent faces of the door, as at 21, and its extremity is fashioned to coact with a buffer plate 22 which is fitted upon the door frame and which is provided with an inclined groove 23, along which the end of the arm 18 rides as the door comes into its full open position.

As previously stated, when the door is closed, the weather strip is held in projected relation and against the tension of the spring 8, by virtue of the engagement of the rod 13 against the adjacent door jamb. But when the door is opened, so that the rod 13 clears the door jamb, the spring 8 acts to move the rod 5 and to retract the weather strip into the casing 1, so that the weather strip does not interfere with the opening movement of the door. However, when the door comes into full open position, the extremity of the arm 18 engages the plate 22, as shown in Fig. 5, and the effect of this engagement is two-fold. The first effect is that the opening movement of the door is gradually retarded or cushioned, the arm 18 and the plate 22 coacting as elements of a door buffer and the spring 8 furnishing the cushioning action. The second effect of the engagement of the arm 18 with the plate 22 is that the rod 5 is moved against the tension of the spring 8 and the weather strip is projected from the casing 1 and is caused to bear upon the floor with sufficient pressure or frictional engagement to prevent an accidental closing movement of the door. The engagement of the weather strip with the floor, obviously, does not interfere with an intentional closing movement of the door and when the closing movement of the door is initiated the spring 8 retracts the weather strip into the casing 1, so that the movement of the door is not retarded, as above explained.

Instead of using the rods 5 and 13, a single rod 5 could be used of a length equal to the combined length of the rods 5 and 13 shown. The arrangement disclosed, however, is preferred, in that the rod 13 may be adjusted lengthwise relatively to the rod 5 to compensate for such slight variations as may be found in the distance between the adjoining faces of the door and the door jamb when the door is in closed position.

Having fully described my invention, I claim:

1. The combination with a door having a bottom recess, of a weather strip mounted for vertical movement in said recess, operating means for the weather strip including a rod slidable longitudinally of the recess, connections for transmitting the movements of the rod to the weather strip and a spring acting on the rod to hold the weather strip projected, the rod having an end extension which, when the weather strip is projected, projects beyond the door to engage the adjacent door jamb as the door comes into closed position, and an arm projecting laterally from the rod, the door having a slot through which the arm projects, and the arm having an inturned end portion beyond the door.

2. The combination with a door having a bottom recess, of a weather strip mounted for vertical movement in said recess, operating means for the weather strip including a rod slidable longitudinally of the recess, connections for transmitting the movements of the rod to the weather strip and a spring acting on the rod to hold the weather strip projected, the rod having an end extension adjustably connected thereto which, when the weather strip is projected, projects beyond the door to engage the adjacent door jamb as the door comes into closed position, and an arm projecting laterally from the rod, the door having a slot through which the arm projects, and the arm having an inturned end portion beyond the door.

3. The combination with a door having a bottom recess, of a weather strip mounted for vertical movement in said recess, operating means for the weather strip including a rod slidable longitudinally of the recess, connections for transmitting the movements of the rod to the weather strip and a spring acting on the rod to hold the weather strip projected, the rod having an end extension adjustably connected thereto which, when the weather strip is projected, projects beyond the door to engage the adjacent door jamb as the door comes into closed position, an arm projecting laterally from the rod, the door having a slot through which the arm projects, and the arm having an inturned end portion beyond the door, and a sleeve which surrounds the adjoining ends of the rod and the adjustable extension thereof and into which the inner end of the arm is threaded to engage said adjoining ends and to fix said rod and its extension against relative movement.

4. The combination with a door having a bottom recess, of a weather strip mounted for vertical movement in said recess, operating means for the weather strip including a rod slidable longitudinally of the recess, connections for transmitting the movements of the rod to the weather strip, and a spring acting on the rod to hold the weather strip projected, the rod having an end extension which, when the weather strip is projected, projects beyond the door to engage the adjacent door jamb as the door comes into closed position, an arm projecting laterally from the rod, the door having a slot through which the arm projects, and the arm having an inturned end portion beyond the door, and a plate secured to the door jamb and having an inclined surface with which the arm coacts as a buffer.

5. The combination with a door having a bottom recess, of a weather strip mounted for vertical movement in said recess, operating means for the weather strip including a rod slidable longitudinally of the recess, connections for transmitting the movements of the rod to the weather strip and a spring acting on the rod to hold the weather strip projected, the rod having an end extension adjustably connected thereto which, when the weather strip is projected, projects beyond the door to engage the adjacent door jamb as the door comes into closed position, an arm projecting laterally from the rod, the door having a slot through which the arm projects, and the arm having an inturned end portion beyond the door, a sleeve which surrounds the adjoining ends of the rod and the adjustable extension thereof and into which the inner end of the arm is threaded to engage said adjoining ends and to fix said rod and its extension against relative movement, and a plate secured to the door jamb and having an inclined surface with which the arm coacts as a buffer.

In testimony whereof I have hereunto set my hand in presence of two subscribing witnesses.

JOHN P. GARDNER.

Witnesses:
W. D. LIPPITT,
AUGUSTINE FITZGERALD.